United States Patent [19]
Merrill et al.

[11] Patent Number: 6,002,432
[45] Date of Patent: Dec. 14, 1999

[54] METHOD FOR OPERATING AN ACTIVE PIXEL SENSOR CELL THAT REDUCES NOISE IN THE PHOTO INFORMATION EXTRACTED FROM THE CELL

[75] Inventors: Richard Billings Merrill, Daly City; Kevin E. Brehmer, San Jose, both of Calif.

[73] Assignee: Foveon, Inc., Santa Clara, Calif.

[21] Appl. No.: 08/707,933

[22] Filed: Sep. 10, 1996

[51] Int. Cl.⁶ .......................... H04N 5/217; H04N 5/335
[52] U.S. Cl. .................. 348/241; 348/308; 348/310; 348/312; 257/292; 250/208.1
[58] Field of Search ............................ 250/208.1, 214.1; 257/290, 291, 292; 348/207, 241, 250, 294, 302, 304, 307, 308–312; H04N 5/217, 5/335

[56] References Cited

U.S. PATENT DOCUMENTS

| | | | |
|---|---|---|---|
| 4,333,111 | 6/1982 | Noda et al. | 358/213 |
| 5,880,460 | 3/1999 | Merrill et al. | 250/208.1 |
| 5,892,541 | 4/1999 | Merrill et al. | 348/302 |
| 5,926,214 | 7/1999 | Denyer et al. | 348/241 |

OTHER PUBLICATIONS

Dickinson, A. et al., "TP 13.5: A 256×256 CMOS Active Pixel Image Sensor with Motion Detection," 1995 IEEE/International Solid–State Circuits Conference, pp. 226–227.

Agwani, S. et al., "A High Speed, Dual Output Channel, Stage Selectable, TDI CCD Image Sensor for High Resolution Applications," pp. 124–133, *SPIE*, vol. 2415, Sep. 1995.

Delbrück, T. et al., "Analog VLSI Phototransduction by continuous–time, adaptive, logarithmic photoreceptor circuits," pp. 1–24, Calif. Inst. of Tech. Computation & Neural Systems Program, CNS Memo No. 30, May 11, 1994.

Delbrück, T., "Imager Circuits," *Synaptics/National Imager Project*, Test Imager Circuit Documentation, pp. 1–8, Aug. 23, 1995.

IMEC VZW, "Fuga data sheet", p. 26, Leuven, Belgium, Aug. 30, 1995.

*Primary Examiner*—Wendy Garber
*Assistant Examiner*—Ngoc-Yen Vu
*Attorney, Agent, or Firm*—Limbach & Limbach L.L.P.

[57] ABSTRACT

The noise in the photo information extracted from an active pixel sensor cell is reduced by resetting the voltage on the photodiode of the cell to the power supply voltage, and by reading the cell immediately before and after the cell is reset. The voltage on the photodiode is reset to the power supply voltage by applying a reset voltage to the gate of the reset transistor conventionally used to reset the photodiode where the reset voltage is sufficiently larger than the power supply voltage to cause the voltage on the photodiode to be pulled up to the power supply voltage.

19 Claims, 3 Drawing Sheets

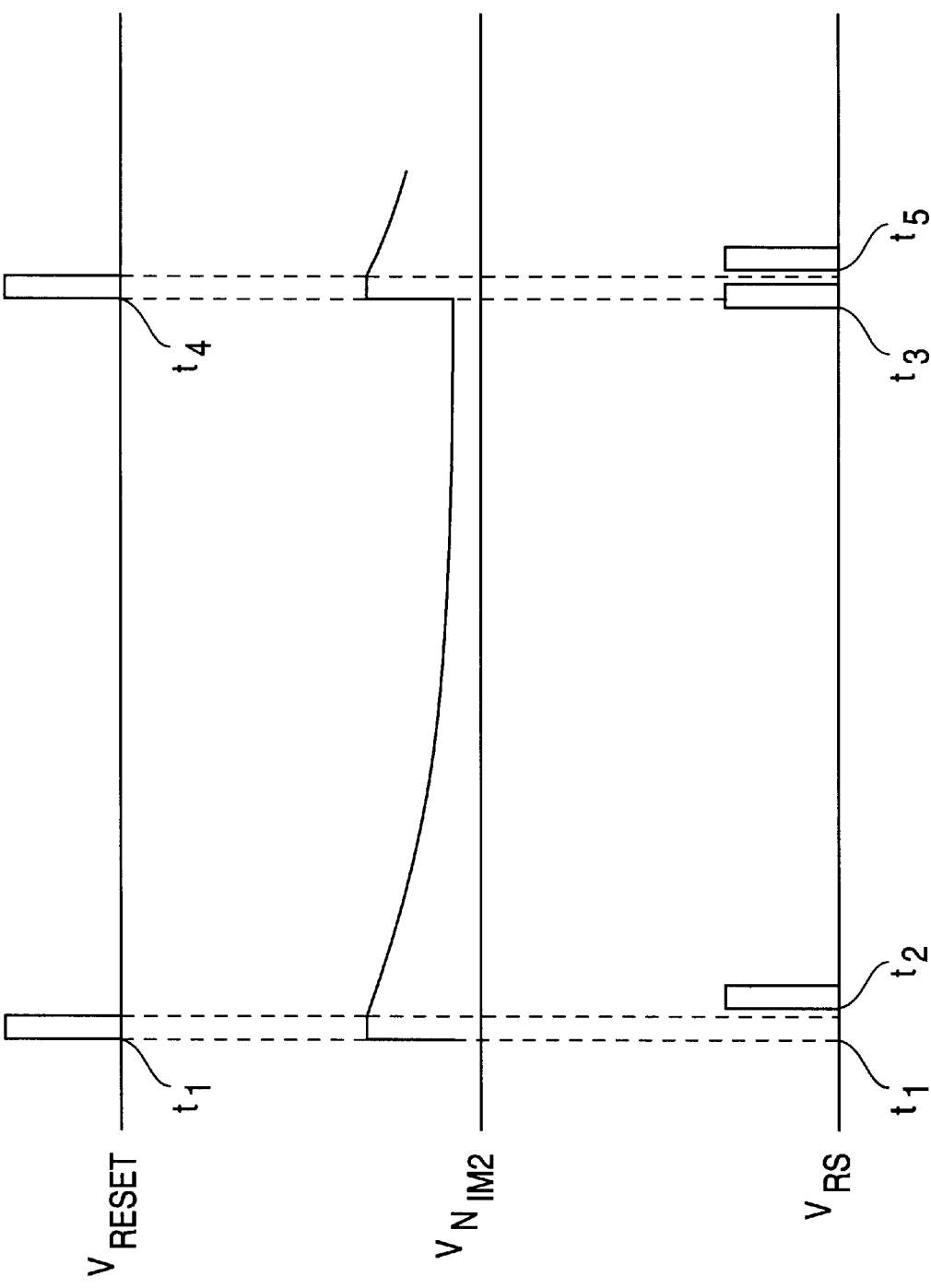

METHOD FOR OPERATING AN ACTIVE PIXEL SENSOR CELL THAT REDUCES NOISE IN THE PHOTO INFORMATION EXTRACTED FROM THE CELL

BACKGROUND OF THE INVENTION

1. Field of the Invention

The present invention relates to a method for operating an active pixel sensor cell and, more particularly, to a method that reduces noise in the photo information extracted from the cell.

2. Description of the Related Art

Charge-coupled devices (CCDs) have been the mainstay of conventional imaging circuits for converting a pixel of light energy into an electrical signal that represents the intensity of the light energy. In general, CCDs utilize a photogate to convert the light energy into an electrical charge, and a series of electrodes to transfer the charge collected at the photogate to an output sense node.

Although CCDs have many strengths, which include a high sensitivity and fill-factor, CCDs also suffer from a number of weaknesses. Most notable among these weaknesses, which include limited readout rates and dynamic range limitations, is the difficulty in integrating CCDs with CMOS-based microprocessors.

To overcome the limitations of CCD-based imaging circuits, more recent imaging circuits use active pixel sensor cells to convert a pixel of light energy into an electrical signal. With active pixel sensor cells, a conventional photodiode is typically combined with a number of active transistors which, in addition to forming an electrical signal, provide amplification, readout control, and reset control.

FIG. 1 shows an example of a conventional CMOS active pixel sensor cell 10. As shown in FIG. 1, cell 10 includes a photodiode 12 connected to a first intermediate node $N_{IM1}$, and a reset transistor 14 that has a drain connected to a power supply node $N_{PS}$, a source connected to node $N_{IM1}$, and a gate connected to a first input node $N_{IN1}$.

Cell 10 further includes a buffer transistor 16 and a row-select transistor 18. Buffer transistor 16 has a drain connected to node $N_{PS}$, a source connected to a second intermediate node $N_{IM2}$, and a gate connected to node $N_{IM1}$, while row-select transistor 18 has a drain connected to node $N_{IM2}$, a source connected to a third intermediate node $N_{IM3}$, and a gate connected to a second input node $N_{IN2}$. In addition, a detection and calculation circuit 20 is connected to the third intermediate node $N_{IM3}$.

FIGS. 2A–2C show timing diagrams that illustrate the operation of cell 10. As shown in FIGS. 1 and 2A–2C, the operation of cell 10 begins by briefly pulsing the gate of reset transistor 14 with a reset voltage $V_{RESET}$ at time $t_1$. The reset voltage $V_{RESET}$, which is equal to Vcc (+5V), resets the voltage on photodiode 12 to an initial integration voltage to begin an image collection cycle.

At this point, the initial integration voltage on photodiode 12 (the first intermediate node $N_{IM1}$) is defined by the equation $V_{RESET}-V_{T14}-V_{CLOCK}$, where $V_{T14}$ represents the threshold voltage of reset transistor 14, and $V_{CLOCK}$ represents reset noise from the pulsed reset voltage (assumed to be constant). Similarly, the initial integration voltage on the second intermediate node $N_{IM2}$ is defined by the equation $V_{RESET}-V_{T14}-V_{CLOCK}-V_{T16}$, where $V_{T16}$ represents the threshold voltage of buffer transistor 16 (functioning as a source follower).

After the reset voltage $V_{RESET}$ has been pulsed and the voltage on photodiode 12 (the first intermediate node $N_{IM1}$) has been reset, a row-select voltage $V_{RS}$ is applied to the second input node $N_{IN2}$ at a time $t_2$ which immediately follows the falling edge of the reset pulse $V_{RESET}$. The row select voltage $V_{RS}$ causes the voltage on the second intermediate node $N_{IM2}$, which represents the initial integration voltage of the cycle, to appear on the third intermediate node $N_{IM3}$. Detection and calculation circuit 20 then amplifies, digitizes, and stores the value of the initial integration voltage as it appears on the third intermediate node $N_{IM3}$.

Next, from time $t_2$, which represents the beginning of the image collection cycle, to a time $t_3$, which represents the end of the image collection cycle, light energy, in the form of photons, strikes photodiode 12, thereby creating a number of electron-hole pairs. Photodiode 12 is designed to limit recombination between the newly formed electron-hole pairs.

As a result, the photogenerated holes are attracted to the ground terminal of photodiode 12, while the photogenerated electrons are attracted to the positive terminal of photodiode 12 where each additional electron reduces the voltage on photodiode 12 (the first intermediate node $N_{IM1}$). Thus, at the end of the image collection cycle, a final integration voltage will be present on photodiode 12 (the first intermediate node $N_{IM1}$).

At this point (time $t_3$), the final integration voltage on photodiode 12 (the first intermediate node $N_{IM1}$) is defined by the equation $V_{RESET}-V_{T14}-V_{CLOCK}-V_S$, where $V_S$ represents the change in voltage due to the absorbed photons. Similarly, the final integration voltage on the second intermediate node $N_{IM2}$ is defined by the equation $V_{RESET}-V_{T14}-V_{CLOCK}-V_{T16}-V_S$.

At the end of the image collection cycle (time $t_3$), the row-select voltage $V_{RS}$ is again applied to the second input node $N_{IN2}$. The row select voltage $V_{RS}$ causes the voltage on the second intermediate node $N_{IM2}$, which represents the final integration voltage of the cycle, to appear on the third intermediate node $N_{IM3}$. Detection and calculation circuit 20 then amplifies and digitizes the value of the final integration voltage as it appears on the third intermediate node $N_{IM3}$.

Following this, detection and calculation circuit 20 determines the number of photons that have been collected during the integration cycle by calculating the difference in voltage between the digitized final integration voltage taken at time $t_3$ and the digitized stored initial integration voltage taken at time $t_2$. At this point, the difference is voltage is defined by the equation $(V_{RESET}-V_{T14}-V_{CLOCK}-V_{T16})-(V_{RESET}-V_{T14}-V_{CLOCK}-V_{T16}-V_S)$, thereby yielding the value $V_S$.

Once the final integration voltage has been digitized by detection and calculation circuit 20, the reset voltage $V_{RESET}$ is again applied to the first input node $N_{IN1}$ at time $t_4$, which immediately follows the rising edge of the row select voltage $V_{RS}$ at time $t_3$. The reset voltage $V_{RESET}$ again resets the voltage on photodiode 12 to begin another image collection cycle.

One of the problems with active pixel sensor cell 10, however, is that the reset voltage $V_{RESET}$ and the row-select voltage $V_{RS}$ have periods, both of which are approximately 30 mS, which are sufficiently long enough to introduce a substantial amount of 1/f noise into the cell. 1/f noise, which results from the trapping and de-trapping of surface charges, can be accurately modeled as variations in the threshold voltages of the reset and buffer transistors 14 and 16.

As a result, the number of photons which are absorbed by photodiode 12 during an image collection period is more properly defined by the equation $(V_{RESET}-V_{T14}-V_{CLOCK}-V_{T16})-(V_{RESET}-V_{T14}-V_{CLOCK}-V_{T16}-V_S-V_\alpha)$, where $V_\alpha$ represents the variations in the threshold voltages of transistors 14 and 16 due to 1/f noise.

Thus, the variations in the threshold voltages of the reset and buffer transistors 14 and 16 add an error term $V_\alpha$ which erroneously yields $V_S+V_\alpha$ as the number of absorbed photons, thereby limiting the accuracy of the cell.

Thus, to reduce the introduction of errors, there is a need for a method for operating an active pixel sensor cell that reduces 1/f-noise variations in the threshold voltages of the reset and buffer transistors.

SUMMARY OF THE INVENTION

Conventionally, the accuracy of an active pixel sensor cell is limited in part by variations in the threshold voltages of the critical transistors of the cell that result from 1/f noise. The present invention provides a method for operating an active pixel sensor cell that reduces the introduction of errors due to 1/f noise by resetting the voltage on the photodiode of the cell to the power supply voltage, and by reading the cell immediately before and after the cell is reset.

The present method operates on an active pixel sensor cell that includes a photon collector which is connected to a first intermediate node, and a reset transistor which is connected to a power supply node, the first intermediate node, and a first input node. In addition, the cell also includes a buffer transistor which is connected to the power supply node, a second intermediate node, and the first intermediate node, and a row select transistor which is connected to the second intermediate node, a third intermediate node, and a second input node.

The method of the present invention begins by applying a row select voltage to the second input node at a first time. The row select voltage causes a final integration voltage on the second intermediate node to appear on the third intermediate node. Following this, a reset voltage is applied to the first input node at a second time, where the second time occurs after the first time, to set an initial integration voltage on the second intermediate node. Next, the row select voltage is applied to the second input node at a third time, where the third time occurs after the second time, to cause the initial integration voltage on the second intermediate node to appear on the third intermediate node. After this, the voltage difference between the initial integration voltage transferred to the third intermediate node at the first time and the final integration voltage transferred to the third intermediate node at the third time is calculated to determine the number of absorbed photons.

In addition, the reset voltage applied to the first input node is sufficiently greater than the voltage on the power supply node so that the reset voltage causes the voltage on the first intermediate node to be set to the voltage on the power supply node.

A better understanding of the features and advantages of the present invention will be obtained by reference to the following detailed description and accompanying drawings which set forth an illustrative embodiment in which the principals of the invention are utilized.

BRIEF DESCRIPTION OF THE DRAWINGS

FIGS. 3A–3C are timing diagrams illustrating the operation of active pixel sensor cell 10 in accordance with the present invention.

DETAILED DESCRIPTION

Figure 1:
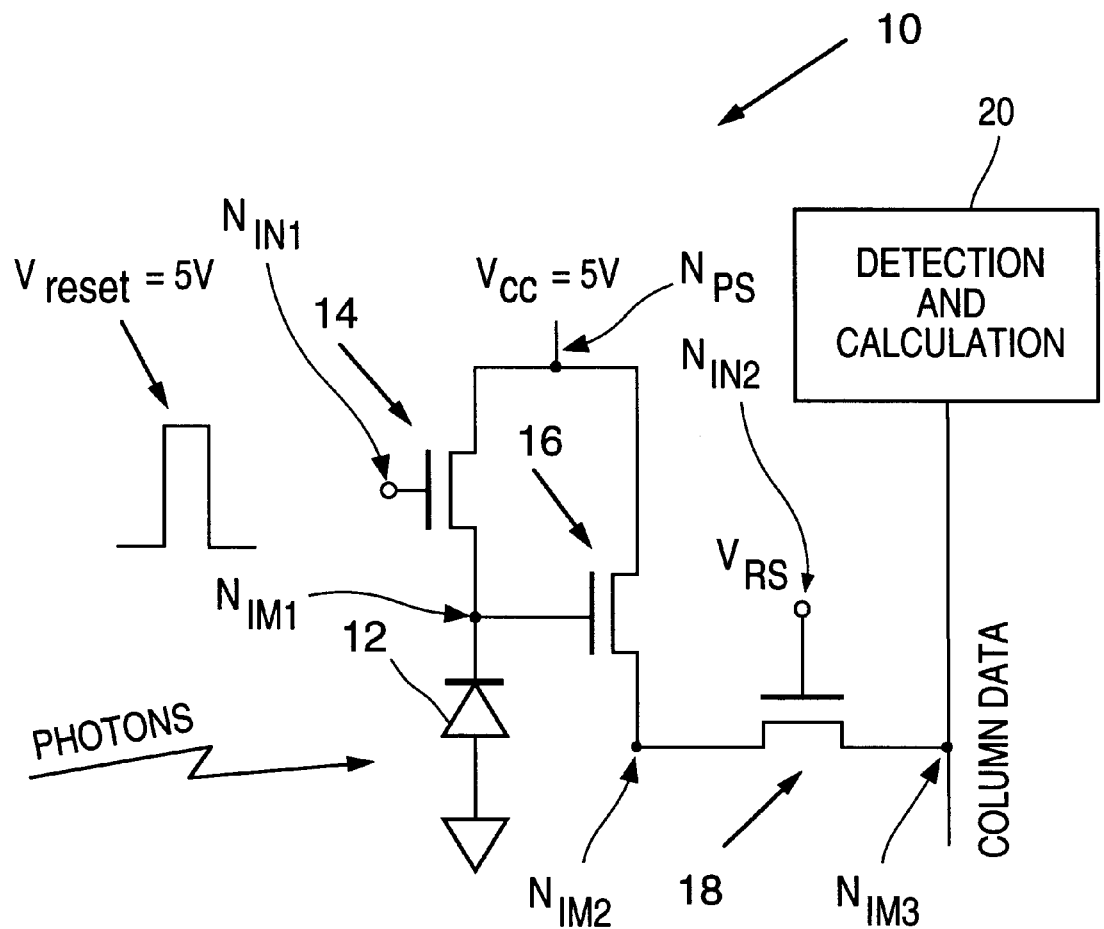
FIG. 1 is a schematic diagram illustrating a conventional active pixel sensor cell 10.

FIGS. 3A–3C are timing diagrams that illustrate the operation of an active pixel sensor cell, such as cell 10 of FIG. 1, in accordance with the present invention. As described in greater detail below, the present method reduces the noise in the photo information extracted from cell 10 by resetting the voltage on the photodiode of the cell to the power supply voltage prior to each image integration cycle, and by reading the cell immediately before and after the cell is reset.

As shown in FIGS. 1 and 3A–3C, the operation of cell 10 begins, as with conventional cells, by applying the reset voltage $V_{RESET}$ to the first input node $_{IN1}$ at time $t_1$. The reset voltage $V_{RESET}$ resets the voltage on photodiode 12 to begin an image collection cycle.

However, in accordance with the present invention, the magnitude of the reset voltage $V_{RESET}$ is set to be sufficiently greater than the voltage on the power supply node $N_{PS}$ so that the voltage on the first intermediate node $N_{IM1}$ is pulled up to the voltage on the power supply node $N_{PS}$.

For example, by placing 3.3 volts on the power supply node $N_{PS}$, and by using a 5-volt reset voltage $V_{RESET}$, reset transistor 14 is forced to operate in the linear region which, in turn, pulls up the voltage on the first intermediate node $N_{IM1}$ to 3.3 volts.

The advantage of forcing reset transistor 14 into the linear region of operation during reset is that the voltage on the first intermediate node $N_{IM1}$ is no longer subject to any variation due to changes in the threshold voltage of reset transistor 14 that result from 1/f noise.

As a result, the voltage on photodiode 12 (the first intermediate node $N_{IM1}$) at the beginning of the image collection cycle (time $t_1$) is now defined by the equation $V_R-V_{CLOCK}$, while the voltage on the second intermediate node $N_{IM2}$ is now defined by the equation $V_R-V_{CLOCK}-V_{T16}$.

Thus, while the voltages on the first and second intermediate nodes $N_{IM1}$ and $N_{IM2}$ are conventionally subject to slight variations at the beginning of each integration cycle due to the threshold voltage variations of reset transistor 14 that result from 1/f noise, the method of the present invention eliminates the effect of 1/f noise from reset transistor 14 by resetting the voltage on the first intermediate node $N_{IM1}$ to a fixed value at the beginning of each integration cycle.

The use of a lower voltage, e.g., 3.3 volts, on the power supply node $N_{PS}$ also provides several additional advantages. One of these advantages is that the noise generated by impact ionization can also be reduced.

Impact ionization noise, which results from electrons striking the lattice under the influence of a strong electric field and forming electron-hole pairs, is most pronounced when buffer transistor 16 is turned on during the signal read out step and a low voltage is on the first intermediate node $N_{IM1}$. With a low voltage (near ground) on the first intermediate node $N_{IM1}$, the voltage on the source of transistor 16 will be a threshold voltage drop lower, while the voltage on the drain will be equal to the voltage on the power supply node $N_{PS}$.

Under these conditions, the use of five volts on the power supply node $N_{PS}$ will cause a substrate current on the order of microamperes to flow from the drain to the source of transistor 16. Since photodiode 12 is sensitive to currents on the order of femtoamperes, only a very small percentage of the impact ionization electrons need to escape beyond the drain region to adjacent photodiodes in order to significantly impact the accuracy of the adjacent photodiodes.

However, by reducing the voltage on the power supply node $N_{PS}$ from 5V to 3.3V, the impact ionization current is reduced by several orders of magnitude, thereby substantially reducing this source of noise.

Another advantage of using a lower voltage on the power supply node $N_{PS}$ is that cell 10 can be easily integrated into CMOS circuits that utilize the same power supply voltages. In addition, lower voltages on the power supply node $N_{PS}$ can be used without significantly limiting the dynamic range of cell 10.

When the exemplary voltages are used, i.e., 3.3V on the power supply node and 5V for the reset voltage, cell 10 has a dynamic range of approximately 3.3V. On the other hand, when five volts are used for both the power supply node and the reset voltage, cell 10 has a dynamic range of approximately 3.5 volts due to the large value of the threshold voltage with back bias. Thus, by dropping the voltage on the power supply node $N_{PS}$ by 1.7V, the dynamic range of cell 10 is only reduced by 0.2 volts.

Figures 2A, 2B, 2C:
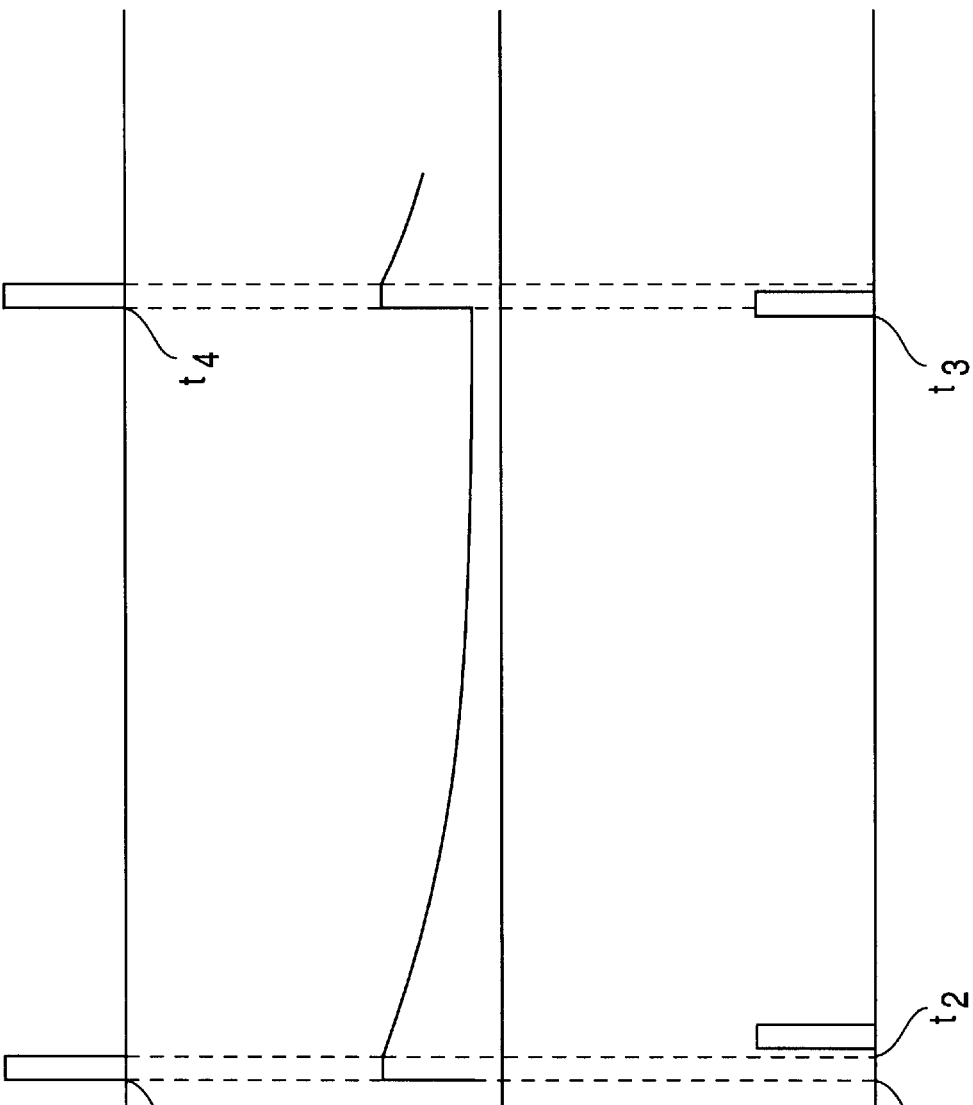
FIGS. 2A–2C are timing diagrams illustrating the operation of active pixel sensor cell 10.

Returning again to FIGS. 1 and 3, after the reset voltage $V_{RESET}$ has been pulsed and the voltage on photodiode 12 (the first intermediate node $N_{IM1}$) has been pulled up to the voltage on the power supply node $N_{PS}$, the row-select voltage $V_{RS}$ is applied to the second input node $N_{IN2}$ at time $t_2$ as described with respect to FIGS. 2A–2C.

The magnitude of the row-select voltage $V_{RS}$ is also set to be sufficiently greater than the maximum voltage on the second intermediate node $N_{IM2}$, such as five volts, so that the voltage on the third intermediate node $N_{IM3}$ will track the voltage on the second intermediate node $N_{IM2}$.

As a result, row select transistor 18 will not contribute a significant amount of noise since transistor 18 will also operate in the linear region which is not subject to $V_T$ variation. In addition, no current (other than a transient) will flow through transistors 16 and 18 when the row-select voltage $V_{RS}$ is applied because the load in detection and calculation circuit 20 is capacitive.

Next, as with the process of FIGS. 2A–2C, light energy, in the form of photons, strikes photodiode 12, thereby creating a number of electron-hole pairs, during the image collection period that extends from time $t_2$ to time $t_3$. As above, the photogenerated holes are attracted to the ground terminal of photodiode 12, while the photogenerated electrons are attracted to the positive terminal of photodiode 12 where each additional electron reduces the voltage on the first intermediate node $N_{IM1}$.

Following this, the row-select voltage $V_{RS}$ is again applied to the second input node $N_{IN2}$ at time $t_3$. The row select voltage $V_{RS}$ causes the voltage on the second intermediate node $N_{IM2}$, which represents the final integration voltage of the cycle, to appear on the third intermediate node $N_{IM3}$. Detection and calculation circuit 20 then amplifies, digitizes, and stores the value of the final integration voltage as it appears on the third intermediate node $N_{IM3}$.

Once the final integration voltage has been digitized, the reset voltage $V_{RESET}$ is again applied to the first input node $_{IN1}$ at time $t_4$, which immediately follows the rising edge of the row select voltage $V_{RS}$ at time $t_3$. The reset voltage $V_{RESET}$ again resets the voltage on photodiode 12 to begin another image collection cycle.

After the reset voltage $V_{RESET}$ has been pulsed and the voltage on photodiode 12 (the first intermediate node $N_{IM1}$) has again been pulled up to the voltage on the power supply node $N_{PS}$, the row-select voltage $V_{RS}$ is applied to the second input node $N_{IN2}$ at a time $t_5$ which, as with time $t_2$, immediately follows the falling edge of the reset signal $V_{RESET}$.

The row select voltage $V_{RS}$ now causes the voltage on the second intermediate node $N_{IM2}$, which represents the initial integration voltage of the next cycle, to appear on the third intermediate node $N_{IM3}$. Detection and calculation circuit 20 then amplifies and digitizes the value of the initial integration voltage as it appears on the third intermediate node $N_{IM3}$.

In accordance with the present invention, detection and calculation circuit 20 then calculates the voltage difference between the digitized stored final integration voltage transferred to the third intermediate node $N_{IM3}$ at time $t_3$, and the digitized initial integration voltage transferred to the third intermediate node $N_{IM3}$ at time $t_5$ to determine the number of photons that have been collected during the first integration cycle that begins at time $t_2$ and ends at time $t_3$.

Thus, the method of the present invention determines the number of photons received during an integration cycle by reading the cell at the end of the integration cycle, and immediately after the cell has been reset at the start of the next integration cycle.

The advantage of reading the cell immediately before and after the cell has been reset is that the time between successive reads can be reduced from approximately 30 mS (from the beginning to the end of the integration cycle) to approximately 10 $\mu$S (from the end of one integration cycle to the beginning of the next integration cycle). As a result, variations in the voltage on the second intermediate node $N_{IM2}$ due to the threshold voltage variations of buffer transistor 16 that result from 1/f noise can also be substantially reduced.

Experimental results have indicated that when the initial integration voltage on photodiode 12 is reset to the voltage on the power supply node (a fixed value from cycle to cycle), and the cell is read immediately before and after the cell is reset, the imaging cell noise voltage can be reduced by approximately 100 times.

Alternately, if less noise reduction is acceptable, either of these techniques, i.e., resetting the voltage on the photodiode to the voltage on the power supply node $N_{PS}$, or reading the cell before and after the cell is reset, can be used alone.

It should be understood that various alternatives to the embodiment of the invention described herein may be employed in practicing the invention. Thus, it is intended that the following claims define the scope of the invention and that methods and structures within the scope of these claims and their equivalents be covered thereby.

What is claimed is:

1. A method for operating an active pixel sensor cell that includes:
   a reset transistor connected to a power supply node, a first intermediate node, and a first input node,
   a photon collector connected to the first intermediate node,
   a buffer transistor connected to the power supply node, a second intermediate node, and the first intermediate node, and
   a row select transistor connected to the second intermediate node, a third intermediate node, and a second input node,
   the method comprising the steps of:
   applying a row select voltage to the second input node at a first time, the row select voltage causing a final integration voltage on the second intermediate node to appear on the third intermediate node;
   applying a reset voltage to the first input node at a second time, the second time occurring after the first time, the reset voltage setting an initial integration voltage on the second intermediate node;

applying the row select voltage to the second input node at a third time, the third time occurring after the second time, the row select voltage causing the initial integration voltage on the second intermediate node to appear on the third intermediate node; and calculating a voltage difference between the initial integration voltage transferred to the third intermediate node at the third time and the final integration voltage transferred to the third intermediate node at the first time.

2. The method of claim 1 wherein the initial integration voltage is greater than the final integration voltage.

3. The method of claim 2 wherein the reset voltage is greater than a voltage on the power supply node.

4. The method of claim 3 wherein the reset voltage causes the voltage on the first intermediate node to be set to the voltage on the power supply node.

5. The method of claim 4 wherein the reset transistor has a drain connected to the power supply node, a source connected to the first intermediate node, and a gate connected to the first input node.

6. The method of claim 5 wherein the photon collector is a photodiode.

7. The method of claim 6 wherein the buffer transistor has a drain connected to the power supply node, a source connected to the second intermediate node, and a gate connected to the first intermediate node.

8. The method of claim 7 wherein the row select transistor has a drain connected to the second intermediate node, a source connected to the third node, and a gate connected to the second input node.

9. A method for operating an active pixel sensor cell that includes:

a reset transistor connected to a power supply node, a first intermediate node, and a first input node, a photon collector connected to the first intermediate node, a buffer transistor connected to the power supply node, a second intermediate node, and the first intermediate node, and a row select transistor connected to the second intermediate node, a third intermediate node, and a second input node, the method comprising the steps of:

applying a reset voltage to the first input node at a first time, the reset voltage being greater than a voltage on the power supply node and setting an initial integration voltage on the second intermediate node;

applying a row select voltage to the second input node at a second time, the second time occurring after the first time, the row select voltage causing the initial integration voltage to appear on the third intermediate node;

collecting photons, the collected photons causing the voltage on the second intermediate node to fall to a final integration voltage;

applying the row select voltage to the second input node at a third time, the third time occurring after the second time, the row select voltage causing the final integration voltage to appear on the third intermediate node; and calculating a difference in voltage between the initial integration voltage on the third intermediate node at the second time and the final integration voltage on the third intermediate node at the third time.

10. The method of claim 9 wherein the initial integration voltage is greater than the final integration voltage.

11. The method of claim 10 wherein the reset voltage causes the voltage on the first intermediate node to be set to the voltage on the power supply node.

12. The method of claim 11 wherein the reset transistor has a drain connected to the power supply node, a source connected to the first intermediate node, and a gate connected to the first input node.

13. The method of claim 12 wherein the photon collector is a photodiode.

14. The method of claim 13 wherein the buffer transistor has a drain connected to the power supply node, a source connected to the second intermediate node, and a gate connected to the first intermediate node.

15. The method of claim 14 wherein the row select transistor has a drain connected to the second intermediate node, a source connected to the third node, and a gate connected to the second input node.

16. A method for operating an active pixel sensor cell that includes:

a reset transistor connected to a power supply node, a first intermediate node, and a first input node, a photon collector connected to the first intermediate node, a buffer transistor connected to the power supply node, a second intermediate node, and the first intermediate node, and a row select transistor connected to the second intermediate node, a third intermediate node, and a second input node, the method comprising the steps of:

applying a row select voltage to the second input node at a first time, the row select voltage causing a final integration voltage on the second intermediate node to appear on the third intermediate node;

storing the final integration voltage transferred to the third intermediate node at the first time as a first voltage;

applying a reset voltage to the first input node at a second time, the second time occurring after the first time, the reset voltage setting an initial integration voltage on the second intermediate node;

applying the row select voltage to the second input node at a third time, the third time occurring after the second time, the row select voltage causing the initial integration voltage on the second intermediate node to appear on the third intermediate node; and storing the initial integration voltage transferred to the third intermediate node at the third time as second voltage;

calculating a voltage difference between the first voltage and the second voltage to determine a number of collected photons.

17. The method of claim 16 wherein the initial integration voltage is greater than the final integration voltage.

18. The method of claim 16 wherein the reset voltage is greater than a voltage on the power supply node.

19. The method of claim 18 wherein the reset voltage causes the voltage on the first intermediate node to be set to the voltage on the power supply node.

* * * * *